US008295387B2

(12) United States Patent
Fuente

(10) Patent No.: US 8,295,387 B2
(45) Date of Patent: Oct. 23, 2012

(54) METHOD OF CODIFICATION AND DECODIFICATION WITH AT LEAST TWO PAIRS OF ORTHOGONAL SEQUENCES

(75) Inventor: Vicente Diaz Fuente, Madrid (ES)

(73) Assignee: GCM Communications, Parque cientifico Tecnoalcala, Madrid (ES)

( * ) Notice: Subject to any disclaimer, the term of this patent is extended or adjusted under 35 U.S.C. 154(b) by 0 days.

(21) Appl. No.: 12/161,018

(22) PCT Filed: Oct. 16, 2007

(86) PCT No.: PCT/ES2007/000582
§ 371 (c)(1),
(2), (4) Date: Nov. 10, 2010

(87) PCT Pub. No.: WO2008/074901
PCT Pub. Date: Jun. 26, 2008

(65) Prior Publication Data
US 2011/0075751 A1    Mar. 31, 2011

(30) Foreign Application Priority Data

Dec. 21, 2006  (ES) .................................. 200603237

(51) Int. Cl.
*H04L 27/28*    (2006.01)

(52) U.S. Cl. .......................... 375/285; 375/259; 375/260
(58) Field of Classification Search .................. 375/285, 375/260, 203; 370/203; 455/59
See application file for complete search history.

(56) References Cited

U.S. PATENT DOCUMENTS

| | | | |
|---|---|---|---|
| 7,372,910 B2 * | 5/2008 | Suh et al. ....................... | 375/260 |
| 2005/0245196 A1 | 11/2005 | Diaz Fuente | |
| 2008/0112501 A1 * | 5/2008 | Diaz Fuente et al. ......... | 375/285 |

FOREIGN PATENT DOCUMENTS

WO    WO 2005/122513    12/2005

* cited by examiner

*Primary Examiner* — David Ometz
*Assistant Examiner* — Ross Varndell
(74) *Attorney, Agent, or Firm* — McCracken & Frank LLC

(57) ABSTRACT

The invention relates to an improved encoding and decoding method with at least two pairs of orthogonal sequences for improving the time necessary for calculating the coefficients of the filter for the purpose of reducing the data overload in communication systems by half by means of the emission of both sequences simultaneously and the emission of the result by means of quadrature modulation to a transmission medium.

2 Claims, 3 Drawing Sheets

METHOD OF CODIFICATION AND DECODIFICATION WITH AT LEAST TWO PAIRS OF ORTHOGONAL SEQUENCES

OBJECT OF THE INVENTION

The present invention relates to an improved encoding and decoding method with at least two pairs of orthogonal sequences used for the estimation of the distortion of the transmission medium by means of the sequential emission of pairs of quadrature complementary sequences, particularly improving the time necessary for calculating the filter coefficients and simplifying the structure thereof.

BACKGROUND OF THE INVENTION

The main state of the art is summarized in patent document PCT 2005000228, which is the only known document which attempts to solve this problem in this manner.

Communication, spectral analysis, RADAR and SONAR systems transmit a signal which reaches the receiver, whether reflected or not, after traversing a transmission medium. This medium behaves like a linear filter with a frequency H (ω) or temporal h[n] response to the impulse. It is necessary in most communication systems to eliminate the effects produced by the transmission medium on the emitted signal s[n] to enable the process of recovering the emitted information. This process is known as equalization. The frequency response can also be used to perform an analysis especially of the medium and thus obtain information about the physical properties thereof.

The channel acts like a filter and distorts the signal. Noise, n[n], due to disturbances in the channel, thermal noise or other signals interfering with the emitted signals must be added to this. In conclusion, the received signal, r[n], can be modeled as:

$$r[n]=s[n]*h[n]+n[n] \quad (1)$$

wherein * represents the convolution operation. A filter with impulse response, f[n], is necessary to eliminate the distortion introduced by the medium in the signal, such that:

$$r[n]*f[n] \approx s[n] \quad (2)$$

However, as the method is herein used, the time of calculating the filter coefficients is high and partially conditions the application of the system.

SUMMARY OF THE INVENTION

The present invention has been developed with the aim of solving the time problem referred to in the preceding paragraph, which invention tries to improve the time necessary to calculate the filter coefficients for the purpose of reducing the data overload in communication systems by half.

According to the new invention, this is obtained due to the fact that when transmitting in a certain order, mutual interferences cancel one another out, enabling the identification of the coefficients simultaneously, and therefore speeding up the calculation process.

According to one aspect of the present disclosure, an improved encoding and decoding method is disclosed that generates an encoding preamble with at least two pairs of orthogonal complementary sequences. The method comprises the steps of emitting a first sequence of a first orthogonally complementary pair in phase and simultaneously emitting a first sequence of a second orthogonally complementary pair by means of the quadrature phase, emitting a second sequence of the first orthogonally complementary pair in phase, and simultaneously emitting a second sequence of the second orthogonally complementary pair by means of the quadrature phase, and emitting a result by means of quadrature modulation to a transmission medium, The resulting correlations for obtaining the coefficients of the filters by means of the correlation operations are:

$H_I = I*A1+I*B1 + N_I/2L$;  $H_Q=Q*A2+Q*B2+N_Q/2L$;
$i_{IQ}=Q*A1+I*B1+N_Q/2L$; and $i_{QI}=I*A2+I+B2+N_I/2L$;
wherein * is the correlation operator.

DESCRIPTION OF THE DRAWINGS

Two sheets of drawings with three figures are attached for the purpose of clarifying the essence of the invention, in which.

filters $H_I$, $H_Q$, $i_{IQ}$, $i_{QI}$
received in-band signals I, Q.
independent signals $I_2$, $Q_2$.

Figure 2:
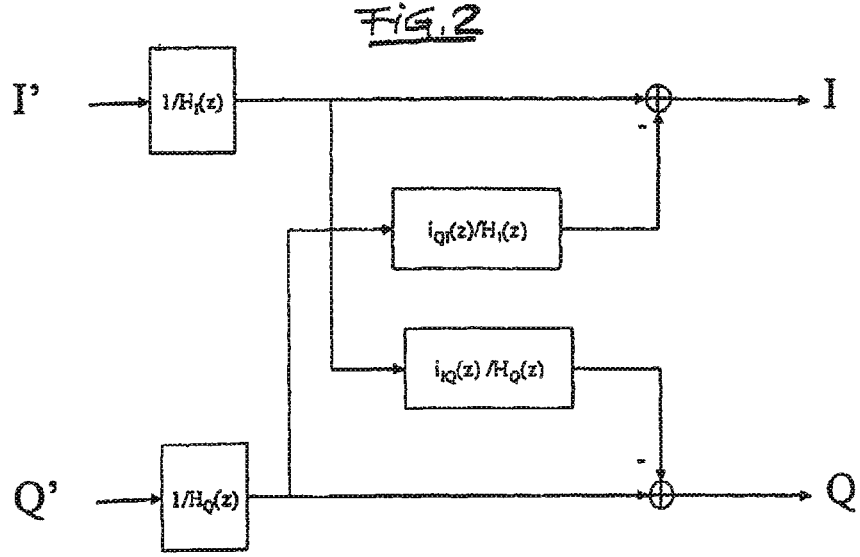

FIG. 2 shows a block diagram of the new equalization and filtering structure wherein I', Q' are the received quadrature signals.

Figure 3:
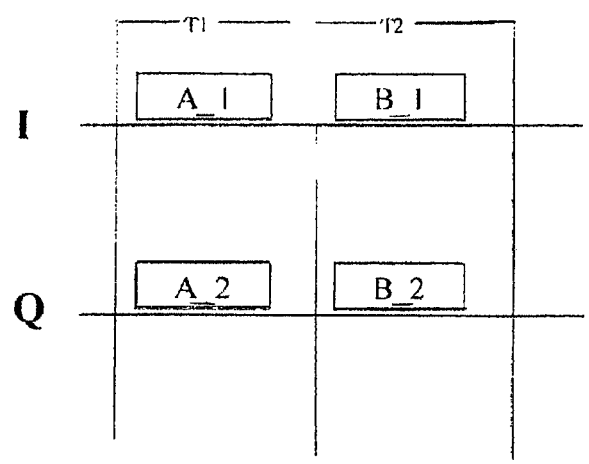

FIG. 3 depicts the data transmission chronogram for correctly receiving the coefficients of the medium and obtaining the equalizer filter of FIG. 2, using the nomenclature (X_Z):

X=sequence A or B of the complementary pair.
Z=orthogonal set 1 or 2.

Figure 4:
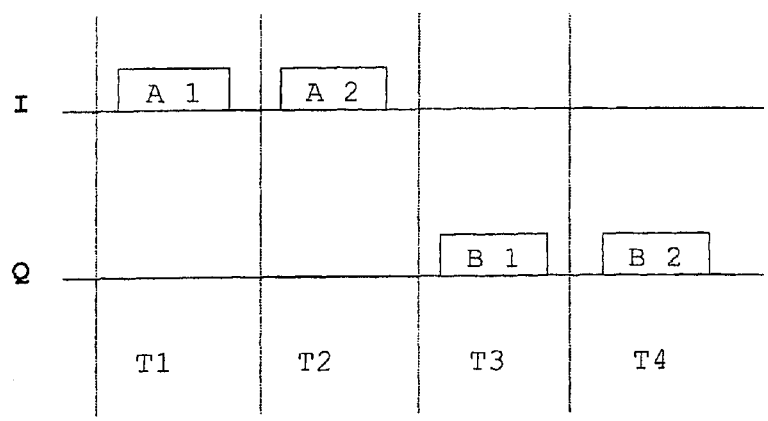

FIG. 4 depicts the chronogram describing the reception preamble and the signals received by each of the two quadrature remodulated phases I/Q from which the data for obtaining the equalizer filter are obtained.

PREFERRED EMBODIMENT OF THE INVENTION

The improved encoding and decoding method of at least two pairs of orthogonal sequences used for the estimation of the distortion of the transmission medium by means of the sequential emission of pairs of quadrature complementary sequences proposed by the invention is characterized by the use of at least two pairs of orthogonal complementary sequences generating a encoding preamble comprising:

a) The emission of the first sequence corresponding to the first pair by means of one of the phases, and the simultaneous emission of the first sequence of the second pair by means of the quadrature phase.
b) Followed by the emission of the second sequence of the first pair by means of one of the phases, and the simultaneous emission of the second sequence of the second pair by means of the quadrature phase.
c) The emission of the result by means of quadrature modulation to a transmission medium.

To that end, the filters must be identified, and they are:

$H_I$, $H_Q$, $i_{IQ}$, $i_{QI}$.

Up until now, said filters were obtained as follows:

$$H_1 = IA1+IA2+N_I/2L$$

$$H_Q = QB1+QB2+N_Q/2L$$

$$i_{IQ} = QA1+QA2+N_Q/2L$$

$$i_{QI} = IB1+IB2+N_I/2l$$

by using four time intervals according to FIG. 4, where it is found that:

IA1.—Correlation of phase I with sequence A1 in interval T1.

IA2.—Correlation of phase I with sequence A2 in interval T2.

QB1.—Correlation of phase Q with sequence B1 in interval T3.

QB2.—Correlation of phase Q with sequence B1 in interval T4.

QA1.—Correlation of phase Q with sequence A1 in interval T1.

QA2.—Correlation of the samples of phase Q with sequence A2 in interval T2.

IB1.—Correlation of the samples of phase I with sequence B1 in interval T3.

IB2.—Correlation of the samples of phase I with sequence B2 in interval T4.

However, if the sequences are sent as explained in the chronogram of FIG. 3, by applying the defined properties of the complementary sequences, and wherein * is the correlation operator, the result in reception is:

$$H_i = I*A1 + I*B1 + N_I/2L$$

$$H_Q = Q*A2 + Q*B2 + N_Q/2L$$

$$i_{IQ} = Q*A1 + Q*B1 + N_Q/2L$$

$$i_{QI} = I*A2 + I*B2 + N_I/2L$$

wherein I and Q are the received quadrature signals $N_I$ and $N_Q$ are the received noise in the I and Q phases, respectively, L is the length of the complementary sequences. and said operations are calculated in intervals T1 (for sequences A of the pairs) and T2 (for sequences B of the pairs), Therefore, the time necessary for calculating the filter coefficients is divided by two in relation to the initial process, which allows reducing the data overload in communication systems by half, which is essential for choosing one characterization method or another.

This is possible because by transmitting in this order, mutual interferences cancel one another out, enabling the identification of the coefficients simultaneously, speeding up the calculation process, as depicted in FIG. 3, where the nomenclature of the transmission preamble is as follows:

Nomenclature (X_Z):

X=sequence A or B of the complementary pair.

Z=orthogonal set 1 or 2.

Figure 1:
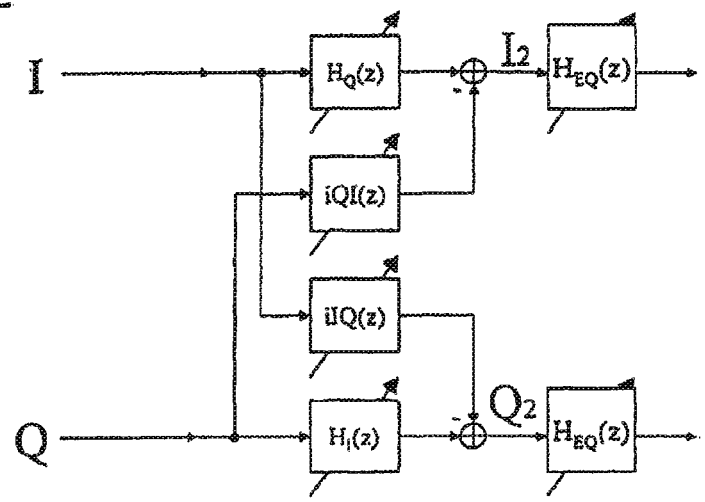
FIG. 1 shows a block diagram of the equalization structure used previously for both phases, wherein the following can be seen.

It is obvious that with this new method the need for resources is reduced, because now there are only four filters instead of six as in previous methods, as can be deduced from comparing FIGS. 1 and 2.

FIG. 1.—Former method

FIG. 2.—New improved method.

Therefore the advantages of implementing the new invention in a semiconductor or chip product are at least the following:

1. Reducing the memory block by half.
2. Reducing multipliers by half.
3. Reducing adders by half.
4. Reducing the filter delay to 50%.
5. Therefore the complexity of the equalization is reduced to 25%.

While a specific embodiment of the invention has been described, it will be obvious for persons skilled in the art that the present invention can be carried out in other specific ways without departing from the scope of the following claims.

The invention claimed is:

1. An encoding and decoding method that generates an encoding preamble with at least two pairs of orthogonal complementary sequences in order to minimize distortion of a signal transmitted through a medium, the method comprising the steps of:

generating a first orthogonally complementary sequence pair A1, B1 and a second orthogonally complementary sequence pair A2, B2, wherein each sequence is of the length L;

applying the first orthogonally complementary sequence A1 of the first orthogonally complementary pair A1, B1 to an in phase portion i of a signal at time t1 and simultaneously applying the first orthogonally complementary sequence A2 of the second orthogonally complementary pair A2, B2 to a quadrature phase portion q of the signal at time t1;

applying the second orthogonally complementary sequence B1 of the first orthogonally complementary pair A1, B1 to the in phase portion i of the signal at time t2, and simultaneously applying the second orthogonally complementary sequence B2 of the second orthogonally complementary pair A2, B2 to the quadrature phase portion q of the signal at time t2; and emitting a resulting signal by means of quadrature modulation through a transmission medium over a channel and calculating filter coefficients by the equations:

$$H_I = I*A1 + I*B1 + N_I/2L$$

$$H_Q = Q*A2 + Q+B2 + N_Q/2L$$

$$i_{IQ} = Q*A1 + Q+B1 + N_Q/2L$$

$$i_{QI} = I*A2 + I+B2 + N_I/2L$$

wherein * is a correlation operator, I is an in phase portion of a resulting signal that is received after transmission, Q is a quadrature phase portion of a resulting signal that is received after transmission, $N_I$ is received noise in the in phase portion I, and $N_Q$ is received noise in the quadrature phase portion Q, and wherein use of the filter coefficients with appropriate filters allows distortion associated with the transmission medium to be identified, minimized, and/or eliminated.

2. An improved method of generating filter coefficients of a medium, the method comprising the steps of:

obtaining a first orthogonally complementary sequence pair A1, B1 and a second orthogonally complementary sequence pair A2, B2, wherein each sequence is of the length L;

receiving a signal encoded with orthogonally complementary sequence A1 in phase i and orthogonally complementary sequence A2 in quadrature phase q at time t1, and encoded with orthogonally complementary sequence B1 in phase i and orthogonally complementary sequence B2 in quadrature phase q at time t2, wherein the signal is transmitted over a channel and through a transmission medium, and wherein the signal is distorted by the transmission;

obtaining a distorted in phase portion I and a distorted quadrature phase portion Q from the received signal at times t1 and t2;

calculating filter coefficients for identifying and/or eliminating a distortion of a channel by the equations:

$$H_I = I*A1 + I*B1 + N_I/2L$$

$$H_Q = Q*A2 + Q+B2 + N_Q/2L$$

$$i_{IQ} = Q*A1 + Q + B1 + N_Q/2L$$

$$i_{QI} = I*A2 + I + B2 + N_I/2L$$

wherein * is the correlation operator, $N_I$ is received noise in I phase, and $N_Q$ is received noise in Q phase, and wherein use of the filter coefficients with appropriate filters allows distortion associated with the transmission medium to be identified, minimized, and/or eliminated.

* * * * *